(12) United States Patent
Rothweiler et al.

(10) Patent No.: US 6,520,522 B2
(45) Date of Patent: Feb. 18, 2003

(54) SIDE IMPACT PROTECTION DEVICE

(75) Inventors: Steffen Rothweiler, Alfdorf (DE); Lothar Zink, Alfdorf (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/772,773

(22) Filed: Jan. 30, 2001

(65) Prior Publication Data

US 2001/0017458 A1 Aug. 30, 2001

(30) Foreign Application Priority Data

Feb. 24, 2000  (DE) .......................... 200 03 366

(51) Int. Cl.⁷ .............................................. B60R 21/22
(52) U.S. Cl. ............................... 280/130.2; 280/739
(58) Field of Search ........................ 280/729, 730.2, 280/743.2, 743.1, 739; B60R 21/22, 21/28

(56) References Cited

U.S. PATENT DOCUMENTS

| | | | | |
|---|---|---|---|---|
| 4,097,065 A | * | 6/1978 | Okada et al. ................ 280/739 |
| 5,016,913 A | * | 5/1991 | Nakajima et al. ........... 280/738 |
| RE34,204 E | * | 3/1993 | Takada ....................... 280/739 |
| 5,219,179 A | * | 6/1993 | Eyrainer et al. ............ 280/739 |
| 5,333,903 A | * | 8/1994 | Eyrainer et al. ......... 280/743 R |
| 5,536,038 A | * | 7/1996 | Bollaert et al. .......... 280/730.2 |
| 6,000,715 A | * | 12/1999 | Tschaeschke ............... 280/729 |
| 6,056,316 A | * | 5/2000 | Yamaji et al. ........... 280/730.2 |
| 6,158,767 A | * | 12/2000 | Sinnhuber ................ 280/730.2 |
| 6,170,860 B1 | * | 1/2001 | Denz et al. ................. 280/729 |
| 6,183,003 B1 | * | 2/2001 | Matsuhashi et al. ...... 280/728.2 |
| 6,189,918 B1 | * | 2/2001 | Stavermann ............. 280/730.2 |
| 6,290,257 B1 | * | 9/2001 | Bunce et al. ................ 280/735 |

FOREIGN PATENT DOCUMENTS

| | | | |
|---|---|---|---|
| DE | 3829368 | | 3/1990 |
| DE | 4101287 | | 7/1992 |
| DE | 29814990 | | 2/1999 |
| JP | 19541440 A1 | * | 6/1996 ........... B60R/21/16 |

OTHER PUBLICATIONS

U.S. Ser. No. 09/378,422, filed Aug. 20, 1999 and U.S. Ser. No. 09/378,423, filed Aug. 20, 1999.

* cited by examiner

*Primary Examiner*—Brian L. Johnson
*Assistant Examiner*—Kelly E Campbell
(74) *Attorney, Agent, or Firm*—Tarolli, Sundheim, Covell, Tummino & Szabo L.L.P.

(57) ABSTRACT

A side impact protection device comprising an inflatable gas bag which in an inflated state at least partially covers at least one side window of a vehicle. At least one emergency opening device is provided on the gas bag, by means of which the gas bag can be vented.

The invention further relates to a side impact protection device comprising an inflatable gas bag and a tensioning band by means of which the gas bag is fastened to the vehicle. A separation device is provided by which the fastening, via the tensioning band, of the gas bag to the vehicle can be released.

11 Claims, 5 Drawing Sheets

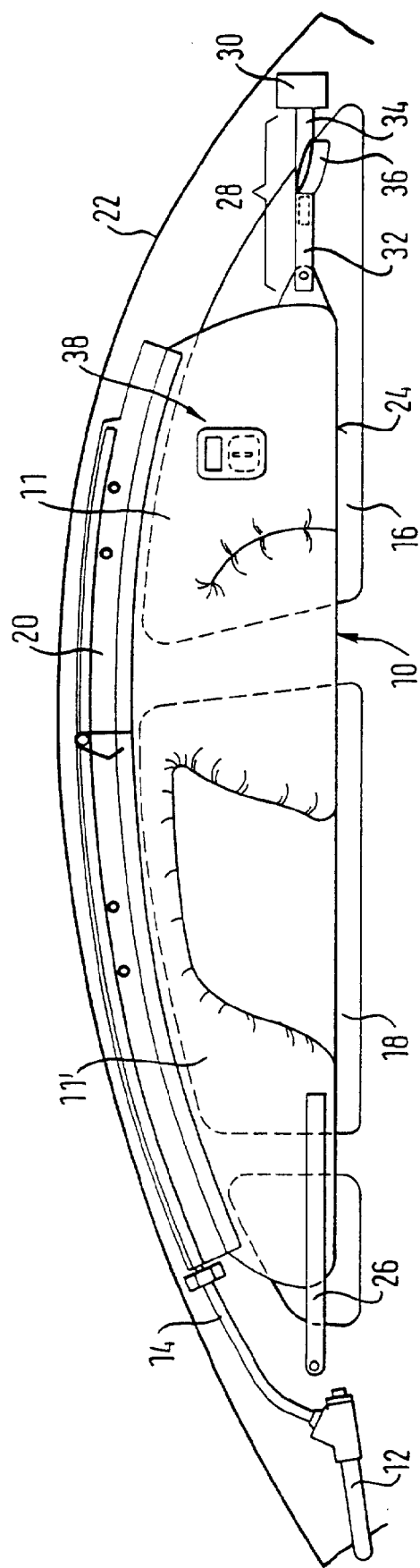

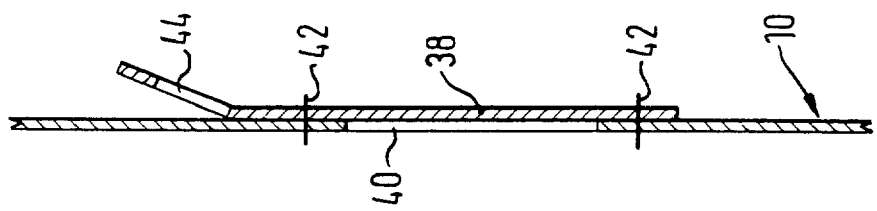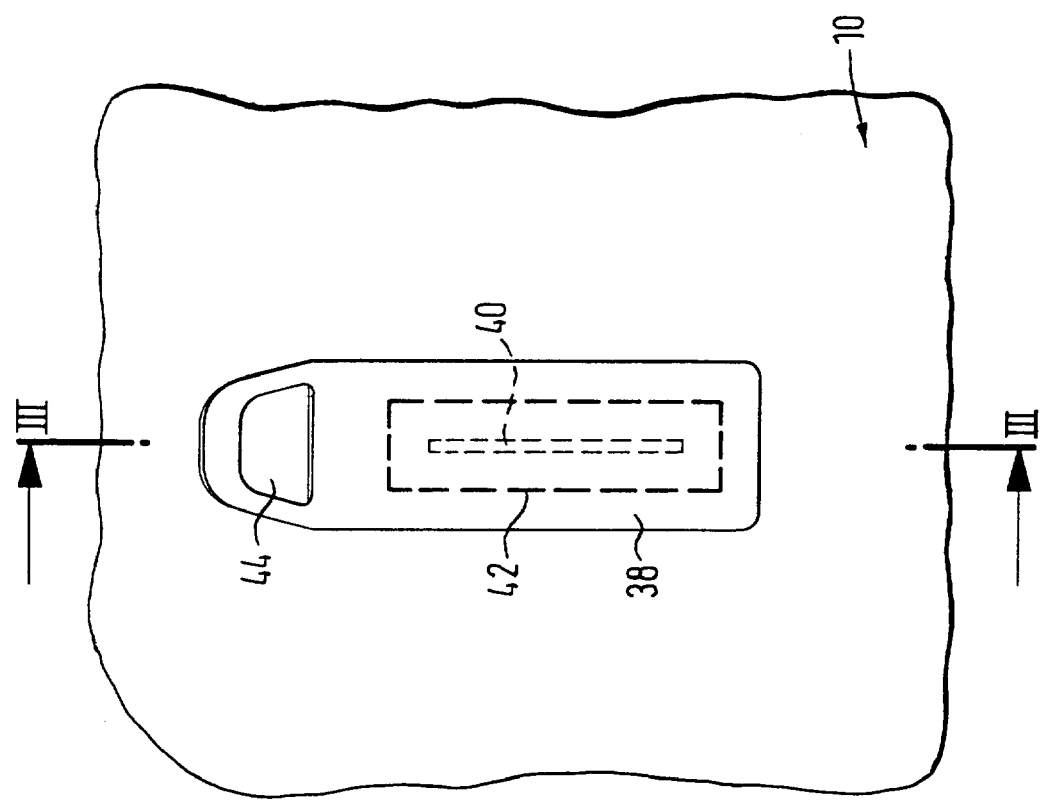

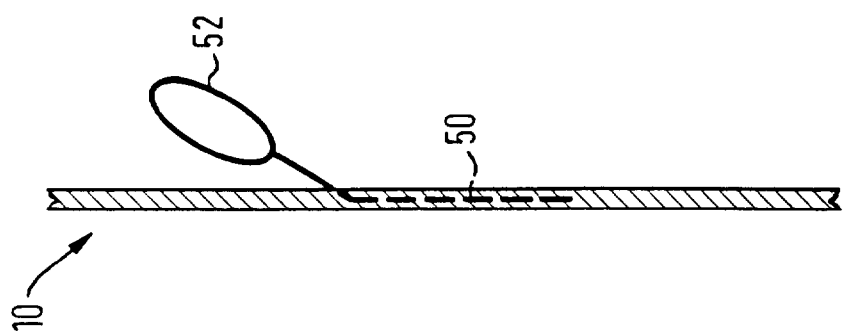
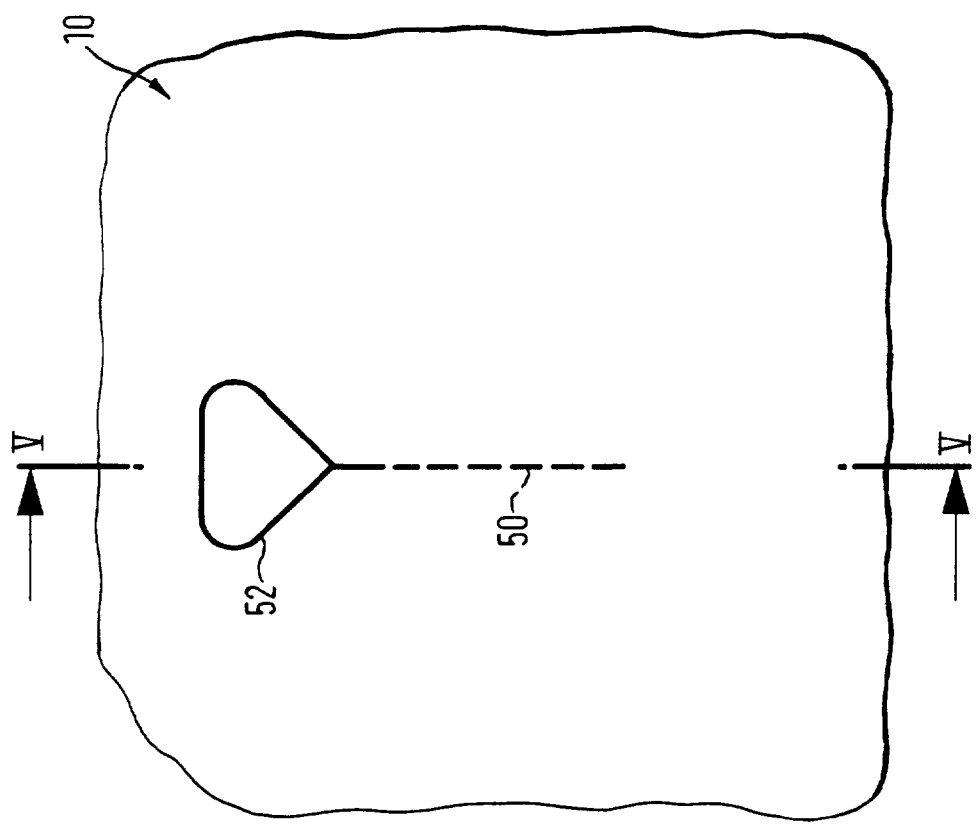

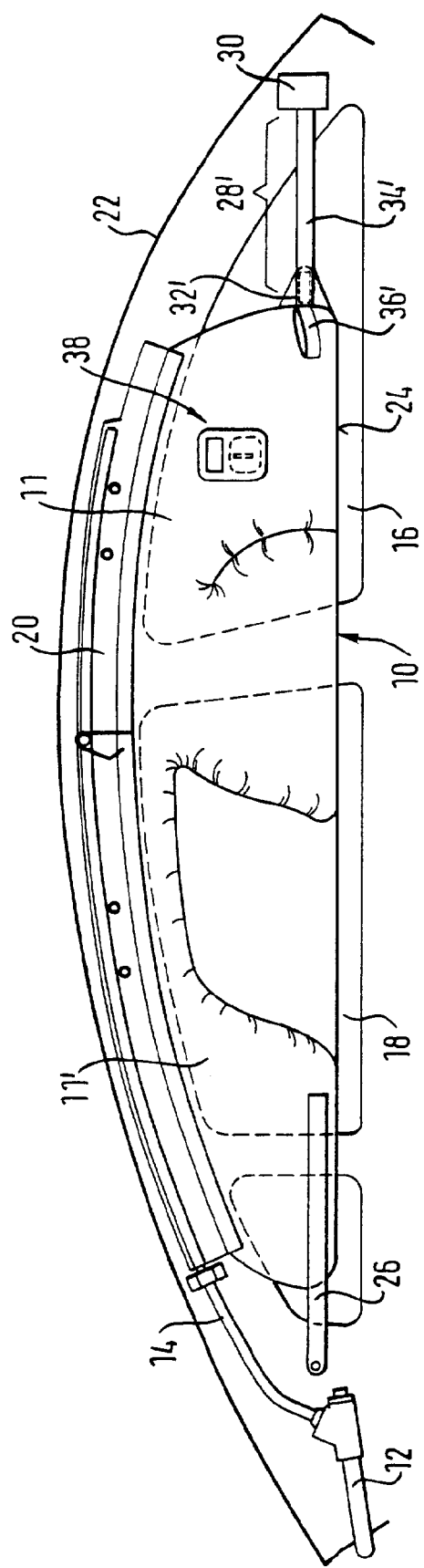

SIDE IMPACT PROTECTION DEVICE

TECHNICAL FIELD

The invention relates to a side impact protection device.

BACKGROUND OF THE INVENTION

In a known protection device comprising an inflatable gas bag, the problem exists that the door opening is at least partially covered by the gas bag after an accident. Here, the gas bag is held in this position through its rigidity, which it receives in the inflated state. This problem especially exists with window bags extending from the A to the C column of a vehicle. In contrast to front gas bags, in the case of a side gas bag it is also desired that the inflated state is maintained longer, so that in the case of a roll-over of the vehicle the protective function is ensured. The protection device can also be held in its position by a tensioning band, whereby likewise the door opening is blocked. In particular when the vehicle door is jammed, as is occasionally the case after an accident, the window opening represents the sole possibility for the vehicle occupant to leave the vehicle. Also for the rescue services, often the only access to carry out lifesaving emergency measures exists via the window.

BRIEF SUMMARY OF THE INVENTION

The invention is therefore based on the problem of improving a protection device mentioned in the introduction to the effect that the gas bag, especially a gas bag extending from the A to the C column of the vehicle, is able to be removed quickly and simply from the door opening after inflation.

This is achieved in a side impact protection device comprising an inflatable gas bag which in an inflated state at least partially covers at least one side window of a vehicle. At least one emergency opening device is provided on the gas bag, by means of which the gas bag can be vented. By the relief of air, the gas bag loses its rigidity and can then be easily pushed aside by the occupant or by the emergency services, so that access to or exit from the interior of the vehicle is facilitated.

According to the preferred embodiment of the invention, the emergency opening device consists of a tear-off tab arranged on the gas bag. With this tear-off tab the emergency opening device can be actuated if required and without further accessories.

An embodiment of the invention makes provision that both on the inner face of the gas bag, facing the vehicle occupant, and also on the outer face of the gas bag facing the side wall of the vehicle an emergency opening device is provided. Thereby, an emergency opening device can be actuated both from the outside, i.e. by emergency services, and also from the inside, i.e. by the occupant of the vehicle, and hence the gas bag can be vented.

The problem is also further solved with a side impact protection device which comprises an inflatable gas bag and a tensioning band by means of which the gas bag is fastened to the vehicle. A separation device is provided by which the fastening, via the tensioning band, of the gas bag to the vehicle can be released. If for example the tensioning band is divided, the gas bag is no longer completely fastened to the vehicle and can therefore be more easily pushed aside. As the separation device is preferably provided on the tensioning band, no additional tool has to be obtained in an emergency, whereby valuable time would be lost.

An advantageous embodiment of the invention makes provision that the tensioning band consists of at least two sections which are held together by a By connections means and can be separated by the separation device, with at least one loop being provided as separation device which is attached to one of the two sections and the connection means consisting of a VELCRO® hook and eye closure. With the VELCRO® hook and eye closure on the one hand the tensile force between the two sections of the tensioning band can be transferred well, and on the other hand, however, the closure can also be easily released by means of a transverse force applied by the loop.

BRIEF DESCRIPTION OF THE DRAWINGS

FIG. 1 shows a view of a side impact protection device according to a first embodiment of the invention;

FIG. 2 shows a detail view of the emergency opening device of the side impact protection device of FIG. 1;

FIG. 3 shows a cross-section through the emergency opening device of FIG. 2 along the line III—III;

FIG. 4 shows a detail view of an emergency opening device of a side impact protection device according to a second embodiment of the invention;

FIG. 5 shows a cross-section through the emergency opening device of FIG. 4 along the line V—V;

FIG. 6 shows a view of a side impact protection device according to a third embodiment of the invention;

DETAILED DESCRIPTION OF THE PREFERRED EMBODIMENTS

Figure 7:
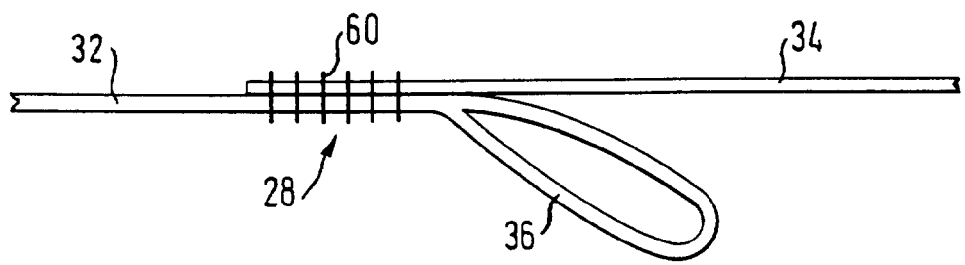
FIG. 7 shows a cross-section through the connection means of the tensioning band of the protection device of FIG. 1.

The side impact protection device in FIG. 1 consists of a gas bag 10 with several inflatable chambers 11, 11' which can be inflated by gas from a gas generator 12 via a distributor pipe 14. FIG. 1 shows the gas bag 10 in the unfolded state, in which it at least partially covers a front side window 16 and a rear side window 18 of a vehicle. At its upper edge the gas bag 10 is fastened in a housing 20, which is arranged on the upper roof frame 22 of the vehicle and holds the gas bag 10 in the folded state. At the rear end of the rear edge 24 of the gas bag 10 a rear tensioning band 26 is arranged and at the front end a front tensioning band 28 is arranged. The gas bag 10 is fastened by the rear tensioning band 26 to the C-column of the vehicle. The front tensioning band 28 connects the front end of the gas bag 10 with a tightening device 30 arranged on the A-column, by which the tensioning band 28 is tightened after the inflating of the gas bag, so that the gas bag is tensioned across the side windows as a result of the tension between the rear tensioning band 26 and the front tensioning band 28. A separation device is arranged on the front tensioning band 28, which is described in more detail below.

The gas bag 10 is provided in addition in the region of an air chamber 11 with an emergency opening device in the form of a tab 38 which covers an opening 40 in the gas bag fabric. The emergency opening device can be seen in greater detail in FIGS. 2 and 3. A slit in the fabric of the gas bag 10 forms the opening 40. The tab 38 is sewn onto the gas bag fabric, with the seam 42 (shown as a dashed line in FIG. 2) surrounding the opening 40. The tab 38 can of course also be arranged in a different manner instead of being sewn on, for instance glued on or vulcanized on. For better handling, the tab 38 is equipped with an engagement opening 44. To actuate the emergency opening device, the tab 38 is grasped at the engagement opening 44 and is torn off from the gas bag by a force obliquely downwards, the opening 40 being exposed, by which the gas can then escape from the gas bag 10. The opening 40 in the gas bag fabric can be dispensed with if, for example, the seam 42 is made with a stronger thread and/or the gas bag fabric is weakened in the region of the seam 42, so that on tearing off of the tab 38 the fabric of the gas bag 10 is torn open.

A simpler variant of the emergency opening device is shown by FIG. 4 and 5. The emergency opening device consists here of a tear thread 50 which is woven into the gas bag fabric. The thread 50 is provided at one end with a loop 52. To actuate this emergency opening device, the loop 52 is grasped and with it the thread 50 is pulled out from the gas bag, the fabric tearing open. With this variant, the tongue is dispensed with, compared with the solution presented above, so that this component and the process of sewing on thereof can be dispensed with.

Figure 8:
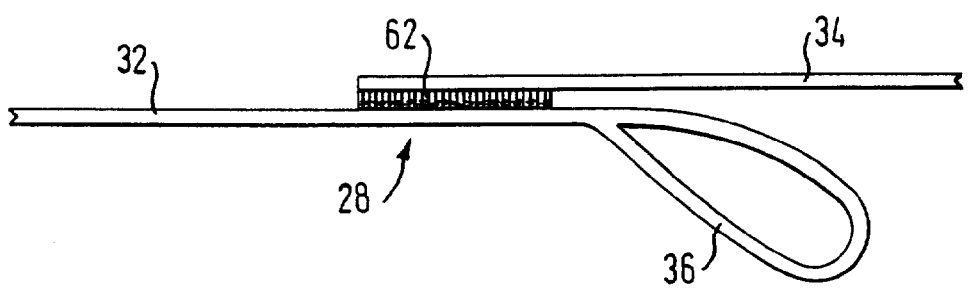
FIG. 8 shows a cross-section through the connection means for the tensioning band of a protection device according to a fourth embodiment of the invention and FIG. 9 shows a cross-section through the connection means for the tensioning band of a protection device according to a fifth embodiment of the invention.
Figure 9:
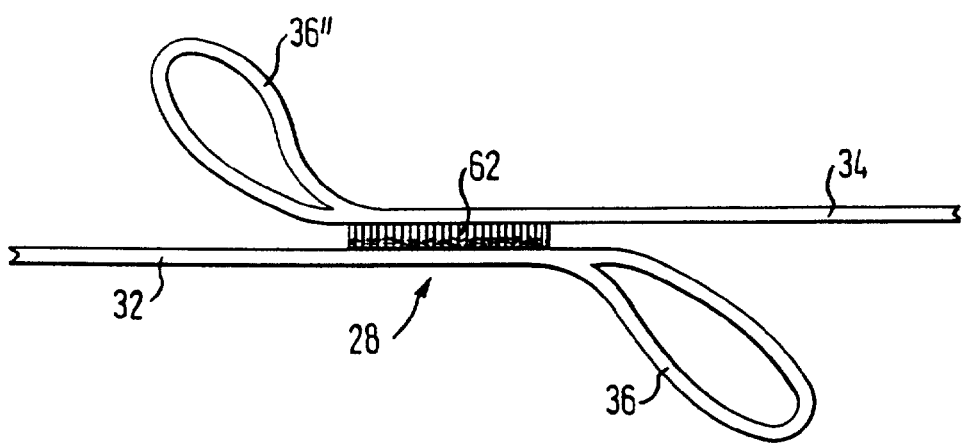

In FIGS. 7 and 8 the separation device on the front tensioning band 28 of the gas bag 10 is illustrated in detail. The front tensioning band 28 consists of a rear section 32 which is fastened to the front end of the gas bag 10, and of a front section 34 which is connected with the tensioning device 30. A loop 36 is arranged on the rear section 32. The loop 36 can, however, be arranged equally well on the front section 34. Advantageously, it is arranged on the section lying at that connection site of the two sections 32, 34 which is closer to the inner face of the vehicle, so that the loop 36 can be easily grasped by the occupant of the vehicle. In a particularly advantageous manner, such a loop 36, 36" can be arranged on both sections, as is shown in FIG. 9, so that this is quickly visible and able to be grasped both from the interior of the vehicle and also from the outside.

In FIG. 7 the front and rear sections 32, 34 are connected with each other by a tear seam 60. To separate the two sections, the loop 36 is grasped and pulled in the direction of the rear section 32, so that the tear seam 60 tears and the two sections 32, 34 are separated. Instead of the tear seam, the front and rear sections of the tensioning band 28 can also be connected by means of a VELCRO® hook and eye closure 62 (see FIG. 8). Such a VELCRO® hook and eye closure 62 ensures on the one hand a good force transmission in the longitudinal direction of the band, but on the other hand can be easily detached by a transverse force applied via the loop 36.

In FIG. 6 an embodiment of the side impact protection device according to the invention can be seen, in which the rear section 32' of the front tensioning band 28' is a component of the gas bag 10. In this case, a loop 36' is fastened as separation device to the front section 34' of the tensioning band 28'. In this embodiment, no separate band is necessary for the rear section 32' of the tensioning band 28'. Also the seams connected therewith for fastening to the gas bag 10 can be dispensed with.

As can be seen from FIGS. 1 and 6, after the gas bag 10 is vented by the emergency opening device or after actuation of the separation device for the front tensioning band 28, 28', the gas bag 10 can be pushed so far aside that the window opening both of the front side window 16 and also of the rear side window 18 is readily accessible.

Advantageously in a vehicle with rear seats, a separation device can also be provided on the rear tensioning band 26 and also in the region of the rear side window 18 a further emergency opening device can be provided. These can then be actuated by an occupant on the rear seat.

Of course, emergency opening devices can also advantageously be arranged on the outer side of the gas bag which faces the side wall of the vehicle and can not be seen in FIGS. 1 and 6, so that these emergency opening devices can also be actuated from outside the vehicle, for example by the rescue services. It is also conceivable to arrange an emergency opening device such that it can be actuated from the interior just as well as from outside the vehicle, for example on the lower edge 24 of the gas bag 10.

In addition, it is advantageous if the loops 36, 36' of the separation device or the tabs 38 of the emergency opening devices are designed so as to be noticeable, for example in a bright color, so that it can be quickly detected by the occupant or by the helpers.

What is claimed is:

1. A side impact protection device comprising:
    an inflatable gas bag, said gas bag covering in an inflated state at least partially at least one side window of a vehicle,
    at least one emergency opening device for venting said gas bag after an occupant has been restrained by said gas bag,
    said emergency opening device being arranged on said gas bag, said emergency opening device being actuatable from outside said gas bag and independently of the internal pressure in said gas bag,
    said gas bag being vented on actuation of said emergency opening device.

2. The side impact protection device according to claim 1 wherein said gas bag consists of a gas bag fabric and said emergency opening device consists of a tear thread applied in said gas bag fabric.

3. The side impact protection device according to claim 1 wherein said gas bag has an inner face facing an occupant of said vehicle, and has an outer face facing a side wall of said vehicle, said emergency opening device being provided both at said inner and outer faces.

4. The side impact protection device according to claim 1 wherein said gas bag is gas-tight.

5. The side impact protection device according to claim 1 wherein said gas bag is so gas-tight that it remains inflated over more than three seconds.

6. A side impact protection device comprising:
    an inflatable gas bag, said gas bag covering in an inflated state at least partially at least one side window of a vehicle,
    at least one emergency opening device arranged on said gas bag, said emergency opening device having an operating part for manual actuation by a person and independently of the internal pressure in said gas bag,
    said gas bag being vented on actuation of said emergency opening device.

7. The side impact protection device according to claim 6 wherein said gas bag consists of a gas bag fabric and said emergency opening device consists of a tear thread applied in said gas bag fabric.

8. The side impact protection device according to claim 6 wherein said gas bag has an inner face facing an occupant of said vehicle and has an outer face facing a side wall of said vehicle, an emergency opening being provided both rat said inner and outer faces.

9. An impact protection device comprising:

an inflatable gas bag, said gas bag covering in an inflated state at least partially at least one side window of a vehicle, at least one emergency opening device arranged on said gas bag, a handle being provided on said emergency opening device for actuating said emergency opening device, said gas bag being vented on actuation of said emergency opening device.

10. The side impact protection device according to claim 9 wherein said gas bag consists of a gas bag fabric and said emergency opening device consists of a tear thread applied in said gas bag fabric.

11. The side impact protection device according to claim 9 wherein said gas bag has an inner face facing an occupant of said vehicle and has an outer face facing a side wall of said vehicle, said emergency opening device being provided both at said inner and outer faces.

* * * * *